(12) United States Patent
Saksa et al.

(10) Patent No.: US 7,058,173 B2
(45) Date of Patent: Jun. 6, 2006

(54) MULTI-STAGE ISOLATION BARRIER CIRCUITRY AND METHOD FOR CONNECTION OF A TELEPHONY DEVICE TO A TELEPHONE LINE

(75) Inventors: Raymond Andrew Saksa, Brownsburg, IN (US); Jefferson Lim Gokingco, Austin, TX (US); Timothy Joseph Dupuis, Austin, TX (US)

(73) Assignees: Thomson Licensing, Boulogne (FR); Silicon Laboratories Inc., Austin, TX (US)

( * ) Notice: Subject to any disclaimer, the term of this patent is extended or adjusted under 35 U.S.C. 154(b) by 327 days.

(21) Appl. No.: 10/085,499

(22) Filed: Feb. 27, 2002

(65) Prior Publication Data

US 2002/0136395 A1    Sep. 26, 2002

Related U.S. Application Data

(60) Provisional application No. 60/272,198, filed on Feb. 28, 2001.

(51) Int. Cl.
*H02M 1/04*    (2006.01)

(52) U.S. Cl. ....................... 379/412; 361/119
(58) Field of Classification Search ................ 379/412, 379/331; 361/119
See application file for complete search history.

(56) References Cited

U.S. PATENT DOCUMENTS

| | | | | |
|---|---|---|---|---|
| 4,314,304 A | * | 2/1982 | Baumbach | 361/124 |
| 4,677,518 A | * | 6/1987 | Hershfield | 361/56 |
| 4,845,580 A | * | 7/1989 | Kitchens | 361/113 |
| 4,907,120 A | * | 3/1990 | Kaczmarek et al. | 361/119 |
| 5,392,349 A | * | 2/1995 | Elder, Jr. | 379/412 |
| 5,416,663 A | * | 5/1995 | Atkins | 361/119 |
| 6,061,445 A | | 5/2000 | Rahamim et al. | |
| 6,198,816 B1 | | 3/2001 | Hein et al. | |
| 6,201,865 B1 | | 3/2001 | Dupuis et al. | |
| 6,385,235 B1 | | 5/2002 | Scott et al. | |
| 6,480,604 B1 | * | 11/2002 | Chandran | 379/416 |
| 2002/0181696 A1 | | 12/2002 | Murakoshi | |

FOREIGN PATENT DOCUMENTS

WO    WO 98/48541    10/1998

OTHER PUBLICATIONS

"3.3 V Global Direct Access Arrangement," Silicon Laboratories, © 2001, (66 pages).

Thompson, Mar, "Silicon Laboratories Surges Ahead with Analog Modem Improvements," Silicon Laboratories, Inc., (17 pages).

* cited by examiner

*Primary Examiner*—Sinh Tran
*Assistant Examiner*—Walter F Briney, III
(74) *Attorney, Agent, or Firm*—Joseph J. Laks; Robert D. Shedd

(57) ABSTRACT

A multi-stage surge protector/isolation barrier is provided for connection between a telephony device and a telephone network. The multi-stage surge protector/isolation barrier includes a first stage and a second stage. The first stage is operative to limit or clamp incoming voltage to a pre-defined level. In one form, the voltage limiting or clamping state includes a spark gap and over-voltage/over-current protector. The second stage is operative to limit or dissipate transients developed by the first stage. In one form, the transient limiting or dissipating stage includes transient filter circuitry. The transient filter circuitry may be implemented as LC filter circuitry. The subject multi-stage surge protector/isolation barrier helps prevent damage to the telephony device caused by voltage surges in the telephone network.

2 Claims, 5 Drawing Sheets

MULTI-STAGE ISOLATION BARRIER CIRCUITRY AND METHOD FOR CONNECTION OF A TELEPHONY DEVICE TO A TELEPHONE LINE

This non-provisional U.S. patent application claims priority to and/or the benefit of earlier filed and co-pending U.S. provisional patent application Ser. No. 60/272,198 filed Feb. 28, 2001, entitled Multi-Stage Surge Protection.

TECHNICAL FIELD OF THE INVENTION

The subject invention relates to the field of isolation systems for use in selectively isolating electrical circuits from one another. More particularly, the subject invention relates to isolation systems for connecting telephone devices to telephone lines.

BACKGROUND

Electrical isolation barriers can be identified in many industrial, medical and communication applications where it is necessary to electrically isolate one section of electronic circuitry from another electronic section. In this context, isolation exists between two sections of electronic circuitry if a large magnitude voltage source, typically on the order of one thousand volts or more, connected between any two circuit nodes separated by the barrier causes less than a minimal amount of current flow, typically on the order of ten milliamperes or less, through the voltage source. An electrical isolation barrier must exist, for example, in communication circuitry that connects directly to the standard two-wire public switched telephone network and that is powered through a standard residential wall outlet.

The Federal Communications Commission (FCC) has determined that residential telecommunications equipment (e.g., solid-state modems) should have surge protection up to a threshold voltage level (e.g., 1500 volts). In particular, the FCC regulations, Part 68, which governs electrical connections to the telephone network in order to prevent network harm, provides that an isolation barrier capable of withstanding 1000 volts rms (root mean square) at 60 Hz with no more than 10 milliamps current flow, must exist between circuitry directly connected to the two wire telephone network and circuitry directly connected to the residential wall outlet.

In order to achieve regulatory compliance, a conventional approach to electrical isolation is by ensuring that there is enough spacing between the telephone network circuits and other circuits referenced to protective earth ground. The components permitted for use across this isolation barrier are limited to transformers, high voltage capacitors, optoisolators, relays and large resistors.

However, it has been determined that in actual field usage, higher surge voltages (e.g. up to 10,000 volts) may occur across this isolation barrier. When such voltages are present, air may begin to ionize anywhere within the enclosed system; dielectric breakdown may occur within the isolation barrier components, including high voltage capacitors. In short, the damage to the system is undeterministic and may require the replacement of the entire system.

One method of reducing the cost of a total system replacement is by use of a pre-determined weak link within and/or before the system. With the weak-link approach, damage due to the high surge voltage is typically known, and thus a field-repair solution is also known. Although the system is rendered inoperable after these large voltage surges, the damage can be fixed easily in the field. Thereafter, a total system replacement is not necessary.

Implementation of the weak link approach can be achieved by using Metal-Varistors (MOVs), Gas Discharge Tubes (GDTs), and/or a spark gap across the barrier. An MOV, however, degrades over the amount of energy it has experienced across its lifetime. Hence, MOVs are unreliable over time. Spark gaps and GDTs both cause a secondary voltage transient event within the system, causing other components to fail. GDTs are more accurate than spark gaps, with regard to the voltage they begin to conduct, but are more expensive than spark gaps.

Thus, there exists an unmet need for a reliable, accurate, and inexpensive system, apparatus, and/or method for providing an alternative to total system replacement when these systems are subjected to high surge voltages.

SUMMARY OF THE INVENTION

The subject invention is a multi-stage surge protector/isolation barrier method and apparatus for telephony devices. Particularly, the subject invention is a surge protector/isolation barrier having two or more stages for telephony devices.

A first stage of the multi-stage surge protector/isolation barrier is operative to provide a weak link and protect the entire system from excessive damage due to a voltage surge. The first stage is operative to clamp or limit output voltage. A second stage of the multi-stage surge protector/isolation barrier is coupled to the first stage. The second stage is operative to dissipate or limit transients or side effects caused by the first stage. The second stage dissipates transients by distributing the transients to multiple, less damaging events.

In one form, the first or voltage limiting/clamping stage is a spark gap and resistor combination that limits or clamps the voltage and flow of current within a short period of time when an overvoltage event occurs. The spark gap and resistor combination, however, creates a voltage transient side effect when the large overvoltage event occurs. The transient side effect is effectively a voltage step function (i.e. a large dV/dt) that creates a large current flow in adjacent circuitry.

In one form, the second or transient limiting/dissipating stage is inductor/inductance-capacitor/capacitance (LC) circuitry that is coupled to the first stage. The LC circuitry provides a sinusoid component in response to the voltage step function input from the first stage. The resonant frequency of the sinusoid component is equal to the resonant frequency of the LC circuit formed by the LC circuitry. Any developed current is distributed among multiple edges at roughly the resonant frequency of the LC circuitry. The total amount of energy dissipated per edge is distributed over time. Stated another way, the LC circuitry functions as a low pass filter, disallowing the high frequency components of a voltage step function.

In effect, the first stage aims to protect the entire system from excessive damage, but effectively creates a transient side effect. The second stage distributes the transient side effect of the first stage to multiple, relatively benign events.

In accordance with an embodiment of the subject invention, there is provided a telecommunication apparatus. The telecommunication apparatus includes a multi-stage surge protector and isolation barrier connectable to a telephone network, and a telephony device in communication with the multi-stage surge protector and isolation barrier.

In accordance with another embodiment of the subject invention, there is provided a surge protector/isolation barrier for a telephony device. The surge protector/isolation barrier includes spark gap circuitry connectable to a telephone network, and LC filter circuitry coupled to the spark gap circuitry and adapted to be coupled to a telephony device.

In accordance with yet another embodiment of the subject invention, there is provided a surge protector for a telephony device that is connectable to a telephone network. The surge protector includes means for clamping a voltage incoming from a telephone network to a predefined level, and means, coupled to the means for clamping a voltage incoming from a telephone network to a predefined level and connectable to the telephony device, for dissipating a transient event associated with the means for clamping a voltage incoming from a telephone network to a predefined level.

DESCRIPTION OF THE DRAWINGS

The above-mentioned and other features and advantages of this invention, and the manner of attaining them, will become more apparent and the invention will be better understood by reference to the following description of embodiment(s) of the invention taken in conjunction with the accompanying drawings, wherein.

Corresponding reference characters indicate corresponding parts throughout the several views.

DESCRIPTION OF PREFERRED EMBODIMENTS

Figure 1:
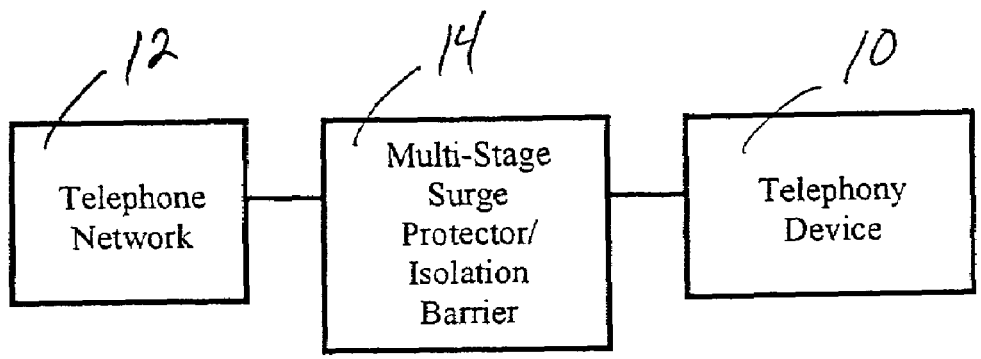
FIG. 1 is a block diagram of a telephony device coupled to a telephone network through an exemplary multi-stage surge protector/isolation barrier in accordance with the principles of the subject invention.

Referring now to the drawings and, more particularly to FIG. 1, there is depicted a block representation of a telephone network 12. The telephone network 12 represents a typical telephone communications network. More particularly, the telephone network 12 represents a typical two-wire telephone communications network. Also depicted in FIG. 1 is a block representation of a telephony device 10. The telephony device 10 represents any type of telephony or telephone device such as a telephone, modem, answering machine, or the like.

In accordance with an aspect of the subject invention, coupled between the telephone network 12 and the telephony device 10 is a block representation of a multi-stage surge protector/isolation barrier 14. The multi-stage surge protector/isolation barrier 14 may take various forms in accordance with the principles presented herein.

The multi-stage surge protector/isolation barrier 14 is operative in one manner to aid in the prevention of damage to the telephony device 10 by overvoltage and/or over-current situations that occur in the telephone network 12. The multi-stage surge protector/isolation barrier 14 is operative in another manner to electrically isolate the telephony device 10 from the telephone network 12. Particularly, the multi-stage surge protector/isolation barrier 14 provides a first stage that functions as a weak link by which the telephony device 10 is saved, and a second stage that functions to reduce and/or dissipate any voltages from the first stage.

Figure 2:
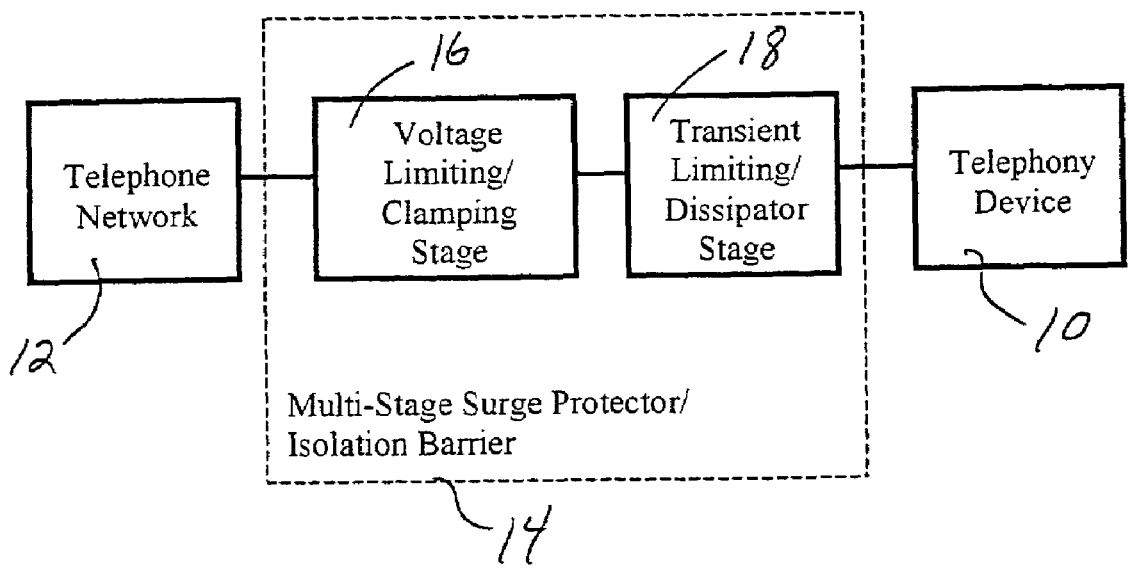
FIG. 2 is a block diagram of the telephony device coupled to the telephone network through an exemplary embodiment of the multi-stage surge protection/isolation barrier in accordance with the principles of the subject invention.

Referring now to FIG. 2, there is depicted a block diagram of an exemplary multi-stage surge protector/isolation barrier 14. Particularly, the multi-stage surge protector/isolation barrier 14 is shown as having two stages, a first stage 16 and a second stage 18. The first stage 16 is a voltage limiting/clamping stage. The second stage 18 is a transient limiting/dissipating stage.

The first or voltage limiting/clamping stage 16 is operative to limit or clamp an incoming or applied voltage to a predefined level for the second stage 18. The first stage may be comprises of voltage limiting/clamping circuitry. However, in so limiting or clamping the applied voltage, a voltage/current transient and/or voltage/current transients are developed, generated, or produced. These transients are thus introduced to the second stage 18. The second or transient limiting/dissipater stage is operative to dissipate or limit the transient and/or transients from the first stage 16. The second stage may be comprised of transient limiting/dissipating circuitry.

Figure 3:
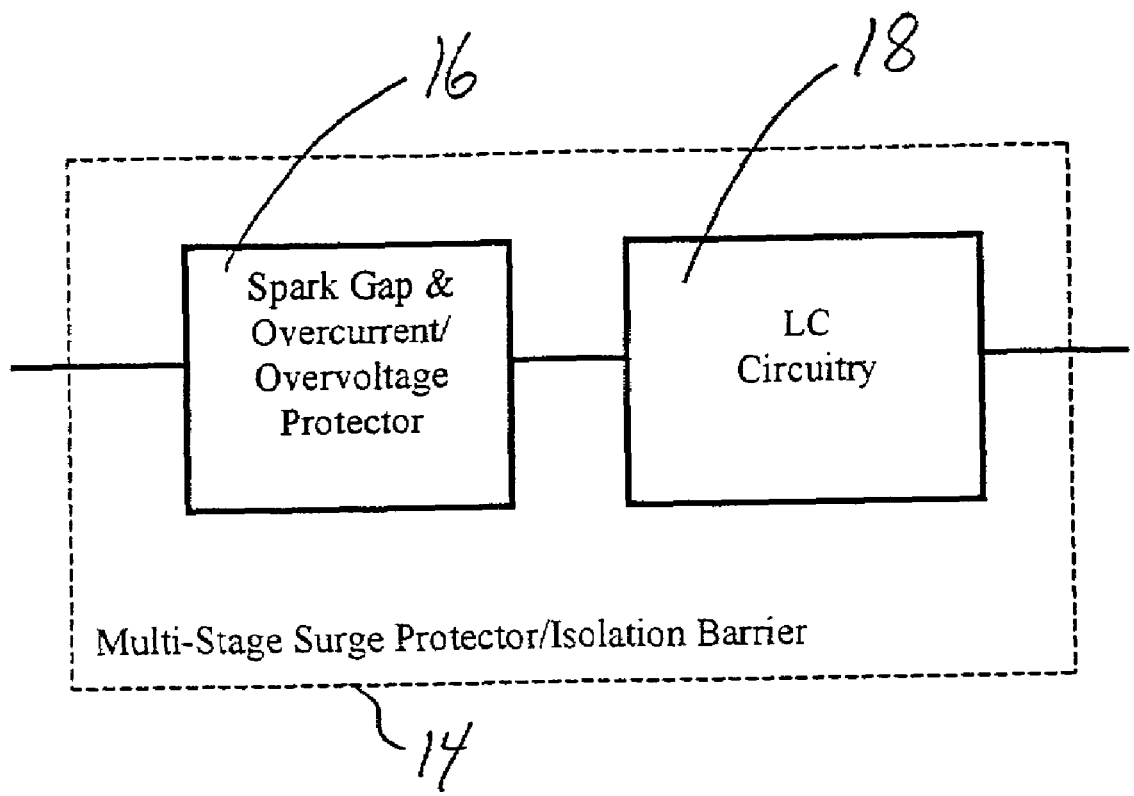
FIG. 3 is a block diagram of an exemplary embodiment of the multi-stage surge protector/isolation barrier in accordance with the principles of the subject invention.

Referring now to FIG. 3, there is depicted a block diagram of an exemplary multi (two)-stage surge protector/isolation barrier 14. Particularly, the first or voltage limiting/clamping stage of voltage limiting/clamping circuitry may be comprised of a spark gap and over-current/over-voltage protector circuitry, while the second or transient limiting/dissipating stage of transient limiting/dissipating circuitry may be comprised of LC (inductor/inductance-capacitor/capacitance) circuitry and/or LC filtering circuitry.

The voltage limiting/clamping stage 16 may be embodied or referred to as a spark gap and over-current/over-voltage protector 16. The spark gap and over-current/over-voltage protector 16 is operative to ground or clamp an incoming over-voltage event. Particularly, the spark gap and over-voltage protector 16 is operative to limit or clamp the over-voltage from the telephone network 12 to a particular or predefined ("safe") voltage level. More particularly, the spark gap and over-current/over-voltage protector 16 provides tip to ground and ring to ground (the two wires of the two-wire telephone network 12) over-voltage and/or over-current protection. However, in the spark gap/voltage clamping process in the spark gap and over-current/over-voltage protector 16, a transient voltage event or step function (e.g. voltage spike) is produced (i.e. a large dV/dt).

The transient limiting/clamping stage 18 may be embodied or referred to as transient filter circuitry. The transient filter circuitry is operative to remove, limit, filter, and/or significantly reduce and/or dissipate the transient voltage event. The transient limiting/clamping stage 18 distributes the electrical energy from the transient voltage event to multiple edges. Particularly, the transient limiting/clamping stage 18 dissipates or filters responsive sinusoid components generated in the transient limiting/clamping stage 18 in response to or as a result of the transient voltage event or voltage step function from the first stage 16.

Figure 4:
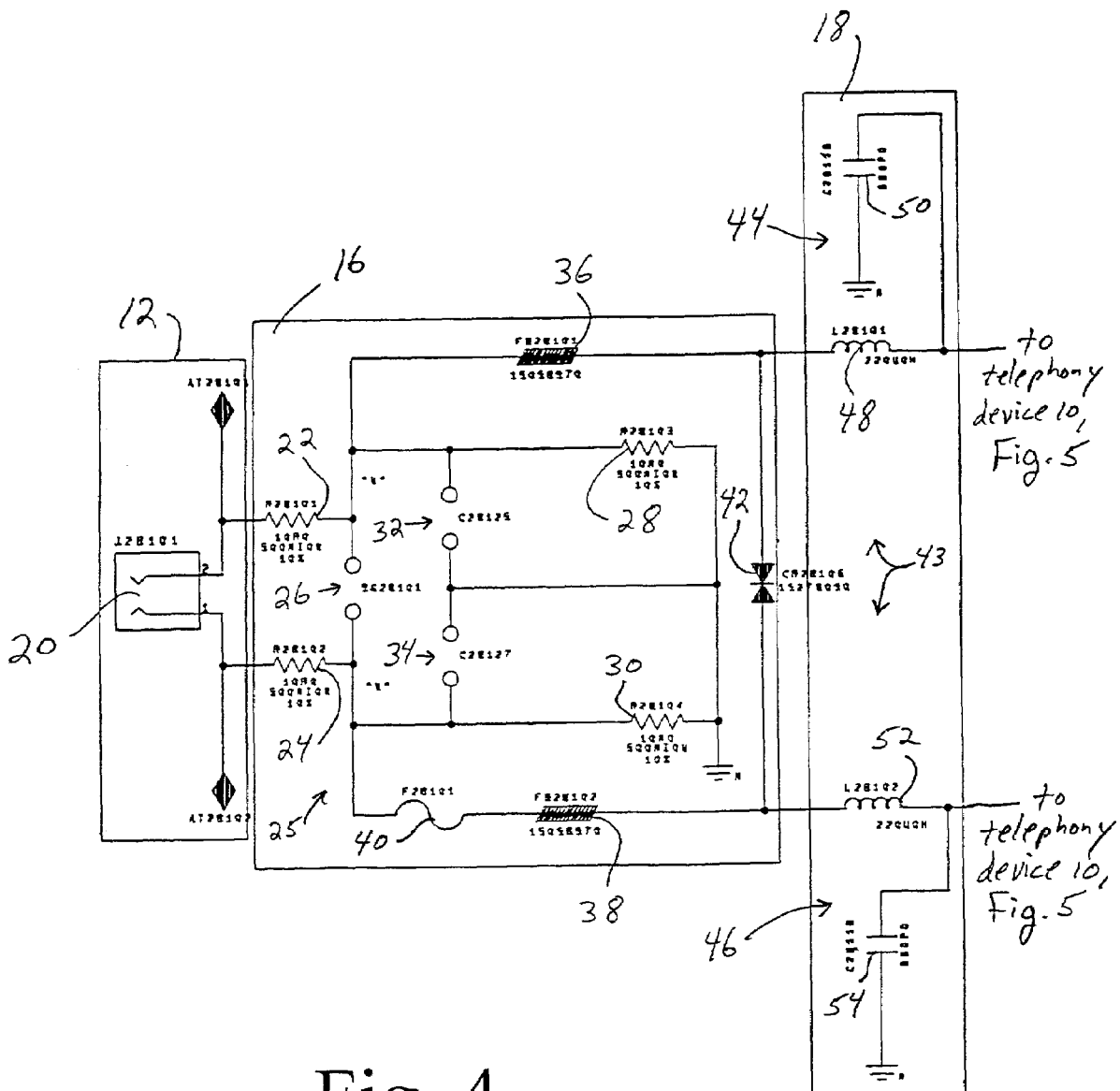
FIG. 4 is an electrical schematic of an exemplary surge protection/isolation barrier in accordance with the principles of the subject invention.

Referring to FIG. 4, there is depicted an electrical schematic of an embodiment of a spark gap and over-current/over-voltage protector 16 and transient filter circuitry 18 wherein connection to the telephone network 12 is represented through a telephone jack or connector 20 such as an RJ-11 connector. The telephone jack 20 has a first line 1 and a second line 2, one being the tip and the other being the ring. Arbitrarily, the first line 1 is the ring and the second line 2 is the tip. The ring line 1 and the tip line 2 are coupled to the spark gap and over-current/over-voltage protector 16 each through a respective resistor 22 and 24 (fuse-resistors). The spark gap and over-current/over-voltage protector 16 arrangement clamps the input voltage to 1500–2500 volts. The resistors 22 and 24 function to limit current flowing into the spark gap and over-current/over-voltage protector 16. The current-limiting (or "fuse") resistors 22 and 24 precede spark gap circuitry 25. The spark gap circuitry 25 is operative, at least in part, to limit or clamp incoming voltage from the telephone network 12 to a predefined and/or predetermined voltage level. The spark gap circuitry 25 includes a first or primary spark gap 26. First and second secondary spark gaps 32 and 34 as well as other components shown and described herein may comprise the spark gap circuitry 25.

In particular, each resistor 22 and 24 is coupled to one side of the first or primary spark gap 26. The spark gap 26 is preferably an air spark gap but may be a specific element type spark gap. In either case, the spark gap 26 has a gap or arc length set in accordance with spark gap principles to allow arcing when a particular voltage is applied. Such arcing allows the dissipation of the voltage to ground.

One end of the spark gap 26 is coupled to a resistor 28 that is coupled to ground and to a first secondary spark gap 32. The other end of the spark gap 26 is coupled to a resistor 30 that is coupled to ground and to a second secondary spark gap 34. The resistors 28 and 30 are bleed-off resistors that prevent a charge build up due to the isolation between pins 1–2 of the connector 20 and the ground. The first and second secondary spark gaps 32 and 34 are preferably specific element type spark gaps, but may be air type spark gaps, and are coupled to ground. Again, in either case, the spark gaps 32 and 34 have a gap or arc length set in accordance with spark gap principles to allow arcing when a particular voltage is applied. Preferably the spark gap length is the same for the spark gaps 32 and 34. Such arcing allows the dissipation of the voltage to ground. In this manner, any over-voltage developed in the telephone network 12 is grounded via the spark gap arrangement.

The current limiting resistor 22 is also coupled to a noise suppressor or ferrite bead 36, while the current limiting resistor 24 is also coupled to a noise suppressor or ferrite bead 38 through a fuse 40. The fuse provides an open circuit should there be a short across the line as explained below. The ferrite beads 36 and 38 are coupled to each other via a diode 42. The diode 42 provides a clamp across the line at around 270 volts. The ferrite beads 36 and 38 also provide an output for the tip (line 2) and the ring (line 1) for the spark gap and over-current/over-voltage protector 16. The ferrite beads 36 and 38 function essentially as a wire for low frequencies but function as an impedance for frequencies in the megahertz (MHz) and/or above.

The fuse 40 provides a "slow-blow open" in the event of a "power-line cross" (i.e. a 60 Hz AC power line falls across exposed telephone pole wires that come into the home) through pin 1 and pin 2 of the connector 20. In this case, diode 42 clamps the voltage appearing across pin 1 and pin 2 of the connector 20 to about 270 volts. Thus, the path for a "power-line cross" event will be one of: (a) pin 1 of the connector 20 through the resistor 24, the fuse 40, the ferrite bead 38, the diode 42, the ferrite bead 36, the resistor 22, and back through pin 2 of the connector 20, or (b) pin 2 of the connector 20, through the resistor 22, the ferrite bead 36, the diode 42, the ferrite bead 38, the fuse 40, the resistor 24, and back through pin 1 of the connector 20.

The spark gap and over-current/over-voltage protector 16 functions in the following manner. Particularly, when a large overvoltage event occurs across pin 1 and pin 2 of the connector 20 (an overvoltage too quick to blow open the fuse 40 or to cause the diode 42 to clamp), the spark gap 26 will fire (activate). With respect to a voltage surge from pin 1 of the connector 20, the voltage surge propagates through the resistor 24 and the spark gap 34 to ground. With respect to a voltage surge from pin 2 of the connector 20, the voltage surge propagates through the resistor 22 and the spark gap 32 to ground. When the spark gaps conduct, current begins to flow through the resistors 22 and/or 24 which function as fuse-resistors. When the fuse-resistor(s) are subjected to enough electrical energy, the fuse-resistor will blow open which stops the flow of electrons through the spark gap, hence bringing the surge event to a halt. The spark gap and over-current/over-voltage protector 16 is thus rendered inoperable.

However, when the spark gaps conduct, a voltage transient is created as an effect. This voltage transient is effectively a voltage step function of a particular magnitude (dV/dt). Because of this large voltage, large currents can flow to components and/or circuitry coupled to the spark gap and overcurrent/over-voltage protector 16.

The spark gap and over-current/over-voltage protector 16 is coupled to the second stage or the transient limiting/dissipating stage 18. The transient limiting/dissipating stage 18 comprises transient filter circuitry 43. The transient filter circuitry 43 may be embodied as LC circuitry 43. The LC (inductor/inductance-capacitor/capacitance) circuitry 43. The LC circuitry 43 filters, impedes, dissipates, reduces, and/or stops transient voltages and/or currents developed, produced, and/or generated in or by the spark gap and over-current/over-voltage protector 16. Since the spark gap and over-current/over-voltage protector 16 essentially produces a step function voltage signal (dV/dt) when overvoltage is applied thereto, a transient voltage event or spike is thus produced. This produces an over-current event in the LC circuitry 43.

Particularly, the LC circuitry 43 filters, reduces, dissipates, and/or removes the transient events that will be generated by the firing of the spark gap arrangement 16 when the voltage exceeds the FCC threshold voltage level (e.g., 1500 volts). Stated another way, the LC circuitry 43 rolls off any voltage surge spikes developed in the spark gap and over-current/over-voltage protector 16.

The LC circuitry 43 provides a response to the input step function voltage signal (dV/dt) or transient voltage event that has a sinusoid component. The resonant frequency of the sinusoid is equal to the resonant frequency of the LC circuitry 43. Thus, instead of one giant current spike generated as a result of the transient voltage event, the current is distributed among multiple edges at roughly the resonant frequency of the LC circuitry. The total amount of electrical energy dissipated per edge is distributed over time. Stated another way, the LC circuitry 43 functions as a low pass filter, disallowing the high frequency components of a voltage step function.

In the LC circuitry 43, the tip line (line 2) from the spark gap and overcurrent/over-voltage protector 16 is coupled to a first inductor-capacitor (LC) filter 44, while the ring line (line 1) from the spark gap and over-current/over-voltage protector 16 is coupled to a second inductor-capacitor (LC) filter 46. Each LC filter 44 and 46 is operative to provide capacitive isolation for the telephony device 10 and provide roll off of any voltage spikes or transient surges from the spark gap and over-current/over-voltage protector 16.

The LC filter 44 includes an inductor 48 in series with the tip line (line 2) and ferrite bead 36 from the spark gap and over-current/over-voltage protector 16. A high voltage capacitor 50 is coupled to an end of the inductor 48 and to ground. The capacitance value (C) of the capacitor 50 is chosen in association with the inductance value (L) of the inductor 48 such as to attenuate or roll off frequencies associated with the transient spike generated by the spark gap and over-current/over-voltage protector 16.

The LC filter 46 includes an inductor 52 in series with the ring line (line 1) and ferrite bead 38 from the spark gap and over-current/over-voltage protector 16. A high voltage capacitor 54 is coupled to an end of the inductor 52 and to ground. The capacitance value (C) of the capacitor 54 is chosen in association with the inductance value (L) of the inductor 52 such as to attenuate or roll off frequencies associated with the transient spike generated by the spark gap and over-current/over-voltage protector 16.

Figure 5:
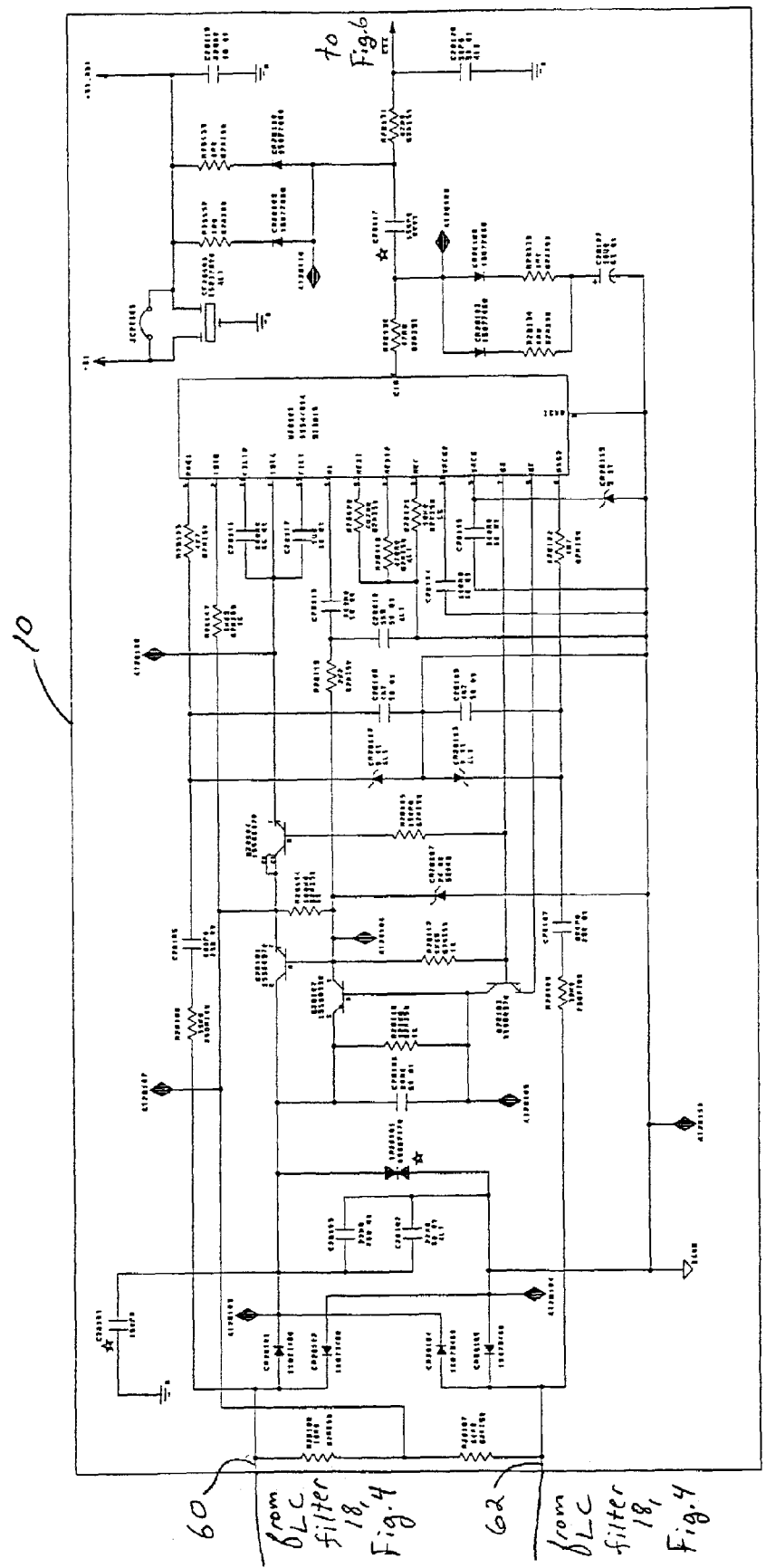
FIG. 5 is an electrical schematic of an exemplary telephony device that may be coupled to the subject surge protection/isolation barrier.
Figure 6:
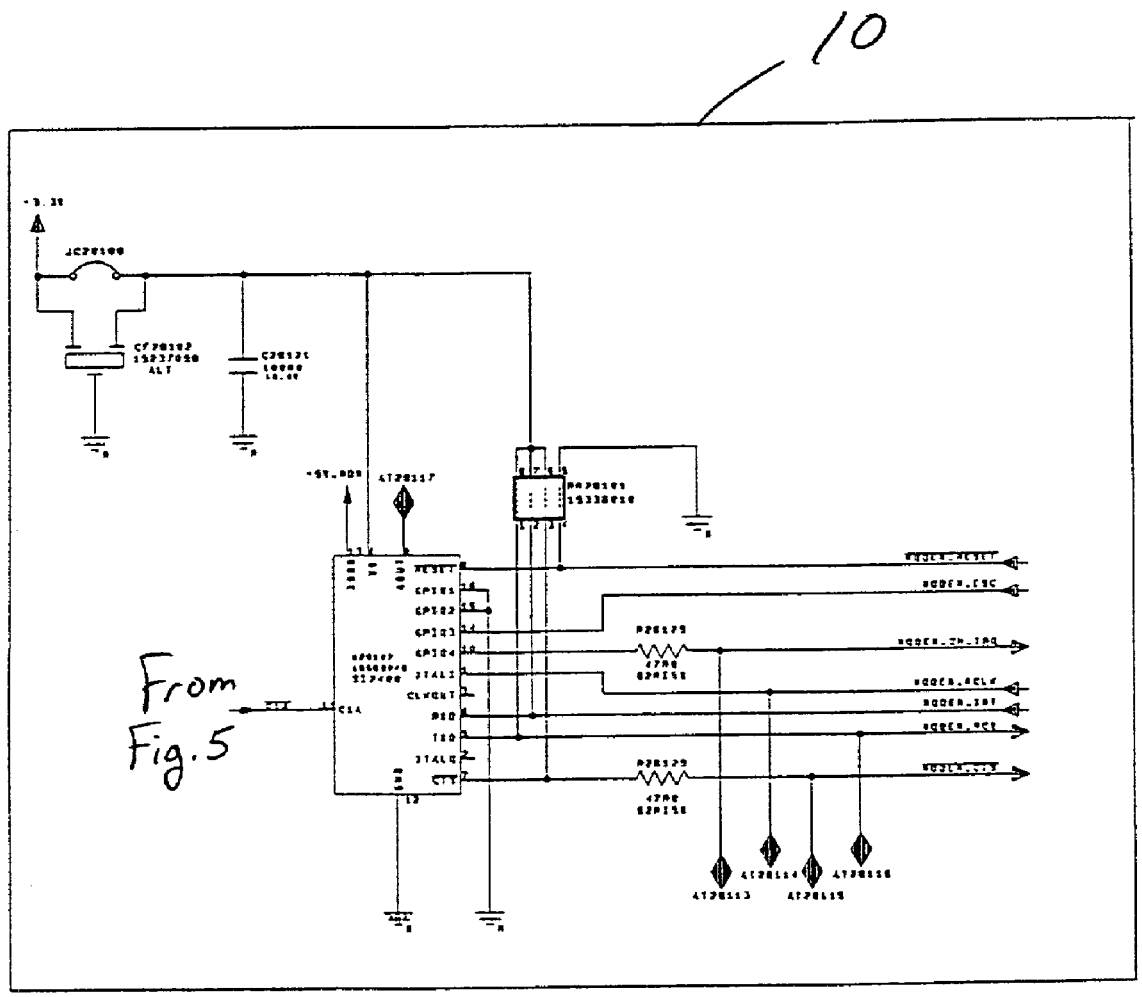
FIG. 6 is a continuation of the electrical schematic of FIG. 5.

FIGS. 5 and 6 depict an electrical schematic of a modem as the telephony device 10. The modem 10 is an exemplary solid-state modem with an integrated direct access arrangement (DAA). The modem 10 is coupled to the LC filter 18. Particularly, the modem 10 is coupled to the tip line and the ring line from the LC filter 18. More particularly, the output of the LC filter 44 (tip line) is coupled to an input 60 of the modem 10, while the output of the LC filter 46 (ring line) is coupled to an input 62 of the modem 10. The modem 10 is operative to function according to a typical modem.

While this invention has been described as having a preferred design, the present invention can be further modified within the spirit and scope of this disclosure. This application is therefore intended to cover any variations, uses, of adaptations of the invention using its general principles. Further, this application is intended to cover such departures from the present disclosure as come within known or customary practice in the art to which this invention pertains and which fall within the limits of the appended claims.

What is claimed is:

1. A telephony protection device comprising:
a first stage having a first first-stage input connectable to a tip line of a telephony network, a second first-stage input connectable to a ring line of the telephony network, a first input resistance in series with said first first-stage input and defining a first first-stage output for the tip line, a second input resistance in series with said second first-stage input and defining a second first-stage output for the ring line, a singular spark gap provided across said first first-stage output and said second first-stage output, and dual secondary spark gaps connected in parallel with said singular spark gap and across said first first-stage output and said second first-stage output; and a second stage having a first second-stage input connected to said first first-stage output, a second second-stage input connected to said second first-stage output, a first filter connected between said first second-stage input and a first second-stage output connectable to a telphony device for attenuating a transient voltage developed on the tip line by said singular spark gap, and a second filter connected between said second second-stage input and a second second-stage output connectable to the telephony device for attenuating a transient voltage developed on the ring line by said singular spark gap;

wherein said first filter of said second stage comprises a first inductor in series between said first second-stage input and said first second-stage output and a first capacitor connected between said first second-stage output and ground, and said second filter of said second stage comprises a second inductor in series between said second second-stage input and said second second-stage output and a second capacitor connected between said second second-stage output and ground.

2. A telephony protection device comprising:
a first stage having a first first-stage input connectable to a tip line of a telephony network, a second first-stage input connectable to a ring line of the telephony network, a first current limiter in series between said first first-stage input and a first first-stage output for the tip line, a second current limiter in series between said second first-stage input and a second first-stage output for the ring line, a singular spark gap provided across said first first-stage output and said second first-stage output, and dual secondary spark gap circuitry connected in parallel with said singular spark gap and across said first first-stage ouput and said second first-stage output; and a second stage having a first second-stage input connected to said first first-stage output, a second second-stage input connected to said second first-stage output, first transient voltage filter circuitry connected between said first second-stage input and a first second-stage output connectable to a telephony device, and second transient voltage filter circuitry connected between said second second-stage input and a second second-stage output connectable to the telephony device;

wherein said first transient voltage filter circuitry of said second stage comprises a first inductor connected in series between said first second-stage input and said first second-stage output and a first capacitor connected between said first second-stage output and ground, and said second transient voltage filter circuitry of said second stage comprises a second inductor in series between said second second-stage input and said second second-stage output and a second capacitor connected between said second second-stage output and ground.

* * * * *